United States Patent [19]

Steer et al.

[11] Patent Number: 4,903,387
[45] Date of Patent: Feb. 27, 1990

[54] METHOD FOR MAKING A PROPORTIONING VALVE HAVING A UNITARY POPPET VALVE ASSEMBLY

[75] Inventors: John E. Steer, South Bend; Donald A. Crumb, Granger, both of Ind.; Richard A. Zander, Niles, Mich.

[73] Assignee: Allied-Signal Inc., Morristown, N.J.

[21] Appl. No.: 227,946

[22] Filed: Aug. 3, 1988

Related U.S. Application Data

[62] Division of Ser. No. 44,378, Mar. 27, 1987, Pat. No. 4,785,847.

[51] Int. Cl.⁴ ............................................. B21D 53/00
[52] U.S. Cl. .............................. 29/888.46; 29/890.124
[58] Field of Search ................... 29/157.1 R, 157.7 C, 29/156.7 B

[56] References Cited

U.S. PATENT DOCUMENTS 4,731,914  3/1988  Zeuner et al. ................. 29/157.1 R
4,767,097  8/1988  Everett et al. ................ 29/157.1 R Primary Examiner—Timothy V. Eley
Attorney, Agent, or Firm—Larry J. Palguta; Ken C. Decker

[57] ABSTRACT

The unitary poppet valve assembly (50) comprises an annular retainer (52) having an open end (54) and an opposite end (55) with a small diameter opening (56) therein. The annular retainer (52) has a plurality of fingers (58) extending laterally therefrom for engagement with the body (12) of a proportioning valve assembly (10). A poppet (70) comprises a poppet head (72) extending radially outwardly from a longitudinal shaft (74), and an oppositely disposed abutment (76). The shaft (74) extends slidably through the small diameter opening (56) in the annual retainer (52), the abutment (76) engaging the retainer (52) adjacent the opening (56). A spring (60) is disposed between a corner or shoulder (57) of the annular retainer (52) and a shoulder (77) defined between the poppet head (72) and poppet shaft (74). The poppet (70) includes a central through opening (78) extending through the abutment (76) and to the head (72), wherein the opening (78) communicates with a lateral through opening (80) of the shaft (74). The unitary poppet valve assembly (50) may be inserted directly within an inlet opening (13) of the proportioning valve assembly (10) so that the fingers (58) engage the body (12) of the proportioning valve assembly (10).

4 Claims, 1 Drawing Sheet

METHOD FOR MAKING A PROPORTIONING VALVE HAVING A UNITARY POPPET VALVE ASSEMBLY

This is a divisional of application Ser. No. 044,378 filed Mar. 27, 1987 and now U.S. Pat. No. 4,785,847.

The invention relates generally to a unitary poppet valve assembly for a proportioning valve, and in particular to a poppet valve assembly that eliminates many assembly tolerance problems.

BACKGROUND OF THE INVENTION

Proportioning valve assemblies have been utilized for many years in conjunction with vehicle braking systems. Depending on the fluid pressure generated by the master cylinder of the brake system, the proportioning valve may operate to restrict fluid pressure being communicated through the brake lines to the rear wheel brakes, and thereby prevent the communication of excessive brake pressure which would cause lockup of the rear wheels and skidding of the vehicle. Typical prior proportioning valve assemblies are those such as illustrated in U.S. Pat. No. 4,213,655 wherein the body of the proportioning valve includes at the inlet end an opening in which is machined a groove for positioning one end of a spring, the spring biasing a valve member or poppet downwardly toward the differential piston of the proportioning valve assembly. The machining of the groove in the very small inside diameter of the inlet opening is difficult and expensive. More importantly, the machining of the opening and assembly of the spring and poppet encompass an accumulation or "stack-up" of tolerances which affect the kneepoint of the output pressure curve of the proportioning valve assembly. The knee of the output curve is determined by the spring load at the position of contact and seal of the differential piston with the poppet. It is desirable to eliminate the stack-up of tolerances so that the proportioning valve assembly operates in accordance with its intended design characteristics, and also to eliminate the more expensive manufacturing costs inherent therein.

SUMMARY OF THE INVENTION

The present invention solves the above problems by providing a unitary poppet valve assembly which may be assembled inexpensively and separately from the main structure of the proportioning valve assembly. The unitary poppet valve assembly is press-fitted into the inlet opening of the proportioning valve assembly, so that the stack-up of tolerances of the components is effectively eliminated and the proportioning valve assembly operates in accordance with the predetermined output curve characteristic. The poppet valve assembly comprises an annular retainer having an opening at one end thereof, a poppet extending longitudinally and slidably through the opening in the one end and into an interior cavity within said annular retainer, the poppet having a poppet head at an end disposed opposite from an abutment located at the other end, resilient means extending between a cavity shoulder located within the cavity and said poppet head, the abutment engaging a retainer shoulder of said annular retainer disposed adjacent said opening in the one end, and at least one lateral retainer extension extending away from an outer surface of the annular retainer, the lateral retainer extension positioned for interference engagement with a body of a proportioning valve structure so that the poppet valve assembly is positioned thereby.

BRIEF DESCRIPTION OF THE DRAWINGS

One way of carrying out the invention is described in detail below with reference to the drawings which illustrate an embodiment in which.

DETAILED DESCRIPTION

Figure 1:
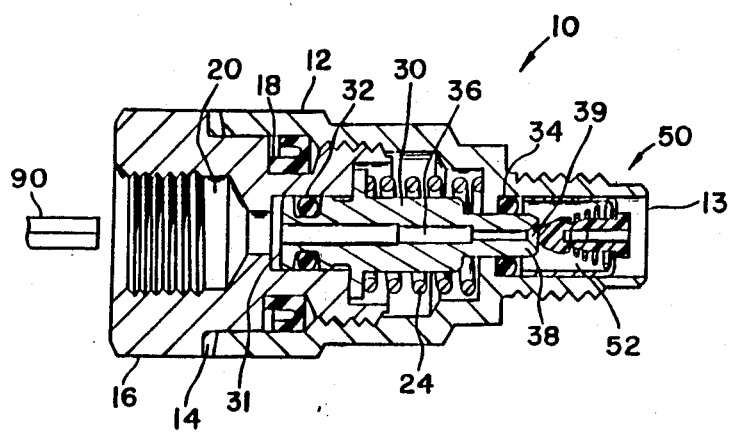
FIG. 1 is a cross-section view of a proportioning valve assembly utilizing the unitary poppet valve assembly of the present invention.
Figure 2:
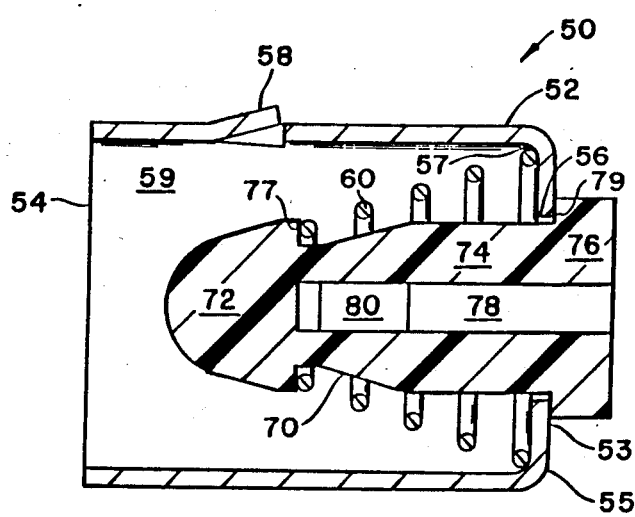
FIG. 2 is an enlarged section view of the unitary poppet valve assembly.

FIG. 1 illustrates a proportioning valve assembly referenced generally by numeral 10. Proportioning valve assembly 10 includes a body 12 having an open end 14 receiving threadably end plug 16. A lip seal 18 is disposed between body 12 and plug 16, and end plug 16 includes a stepped through opening 20 which receives at one end a portion of a differential area piston 30. Differential area piston 30 has ring seals 32 and 34 disposed thereabout, and a through opening 36. A spring 24 biases the differential area piston toward end plug 16. Piston end 38 extends into housing inlet opening 13 which receives the ring seal 34. Valve seat 39 is positioned adjacent a unitary poppet valve assembly 50. Unitary poppet valve assembly 50 comprises an annular retainer 52 formed generally in the shape of a cylinder, the cylinder having an open end 54 opposite a small diameter opening 56 in end 55. End 55 includes a shoulder or flange area 53 disposed adjacent the opening 56. A plurality of extensions or fingers 58 extend outwardly from the surface of annular retainer 52. Annular retainer 52 defines an interior cavity 59 which has spring 60 disposed therein. Spring 60 extends between a corner or shoulder 57 and a poppet head 72 of poppet 70. Poppet 70 comprises the poppet head 72, longitudinal shaft or body 74, abutment 76, central through opening 78, and lateral through opening 80. Head 72 includes a diameter which is larger than the diameter of shaft 74 to define a shoulder 77 which receives an end of spring 60. The abutment 76 extends radially outwardly of shaft 74 to provide an abutment surface 79 which engages shoulder 53 adjacent opening 56. The central through opening 78 and lateral through opening 80 permit fluid flow therethrough so that hydraulic brake fluid may communicate with the interior of the proportioning valve assembly 10.

Unitary poppet valve assembly 50 is assembled by placing spring 60 on a pin fixture (not shown), placing annular retainer 52 onto the spring, and then moving poppet head 72 through opening 56 and snapping head 72 through the small end coils of spring 60. This provides a subassembly which is inserted within inlet opening 13 of proportioning valve assembly 10. Proportioning valve assembly 10 is assembled by inserting an arbor 90 (see FIG. 1) into opening 20 so that the arbor engages an end 31 of the differential area piston 30. Body 12 of the proportioning valve is supported while the arbor is displaced into the opening 20 so that piston 30 is displaced against the load of spring 24. The piston is displaced and the spring compressed until the fluid pressure load required for displacing the piston into engagement with the poppet is attained. Then unitary poppet valve assembly 50 is installed in body 12 by pressfitting the subassembly into opening 13. The unitary poppet valve assembly is press-fitted into inlet opening 13 until head 72 of poppet 70 engages valve seat 39, wherein the piston is utilized as the installation stop. Thus, the installation force applied to the unitary poppet valve assembly is applied against abutment 76 of the poppet, which also pushes annular retainer 52 into opening 13. Fingers 58 engage the surface of the opening 13 so that the poppet valve assembly will remain at the position to which it has been pressed-fitted. Then arbor 90 is removed so that piston 30 may return to the at-rest position shown in FIG. 1, whereby seat 39 is displaced away from head 72. Thus, the assembly procedure has eliminated nearly all of the "knee" tolerances inherent within prior designs, and also provides an inexpensive and easily assembled unitary poppet valve assembly.

The unitary poppet valve assembly is illustrated as utilizing a spring in compression. The spring may be revised to accommodate a tension spring. The annular retainer 52 also provides a stop for O-ring seal 34. As piston 30 is displaced during operation, it is possible for seal 34 to be moved along piston end 38 and toward poppet head 72. However, seal 34 will engage the end of annular retainer 52 which retains the seal in place about end 38 of piston 30.

Various modifications of the above-described embodiment of the invention will be apparent to those skilled in the art. It is to be understood that such modifications can be made without departing from the scope of the invention.

We claim:

1. A method for assembling a valve device, comprising the steps of (a) locating a piston within a body of the valve device, the piston having an opening for fluid flow therethrough and biased by resilient means, (b) securing the body and inserting into the device a member which engages the piston and displaces the piston a predetermined amount against the biasing force of said resilient means, (c) inserting into an open portion of the device a poppet valve assembly comprising an annular retainer with a poppet extending longitudinally and slidably through an opening in one end of the retainer, the poppet having a poppet head disposed opposite an abutment, the poppet head located within an interior cavity of the retainer and a spring extending between the retainer and poppet, the retainer having at least one lateral retainer extension extending away from an outer surface of the retainer, (d) advancing the poppet valve assembly into the open portion of the device until the poppet head engages the opening in the piston, the lateral retainer extension engaging the body to prevent retraction of the assembly from the open portion, and (e) removing the member so that the piston is returned by the resilient means to an at-rest position.

2. The method in accordance with claim 1, further comprising the step of inserting the poppet head through the opening in the retainer until the abutment engages the retainer and the spring is trapped between the poppet head and retainer.

3. The method in accordance with claim 2, wherein the poppet includes a central opening communicating with a lateral through opening which extends laterally through the poppet.

4. The method in accordance with claim 1, wherein the device comprises a proportioning valve assembly, the piston being a differential area piston having a valve seat at the opening in the piston and the valve seat engaged initially by the poppet head when the poppet valve assembly is advanced in the open portion, the engagement of the poppet head with the valve seat positioning the poppet valve assembly within the open portion of the proportioning valve assembly, and the valve seat moving away from the poppet head when the member is removed.

* * * * *